F. E. SELF.
PRESS.
APPLICATION FILED OCT. 2, 1908.
929,717.
Patented Aug. 3, 1909.
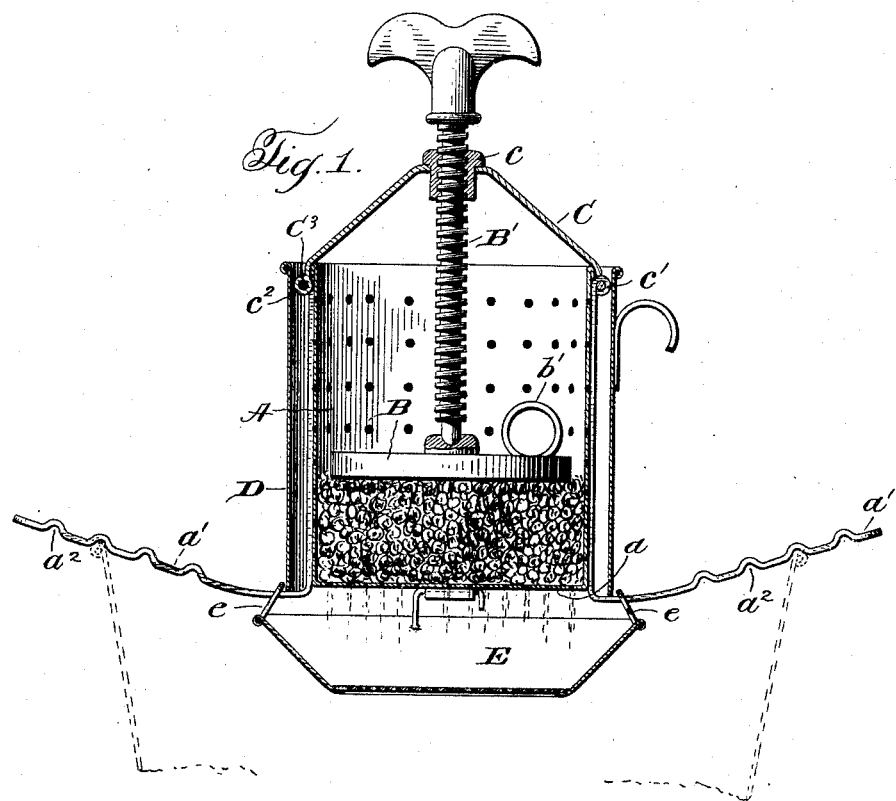
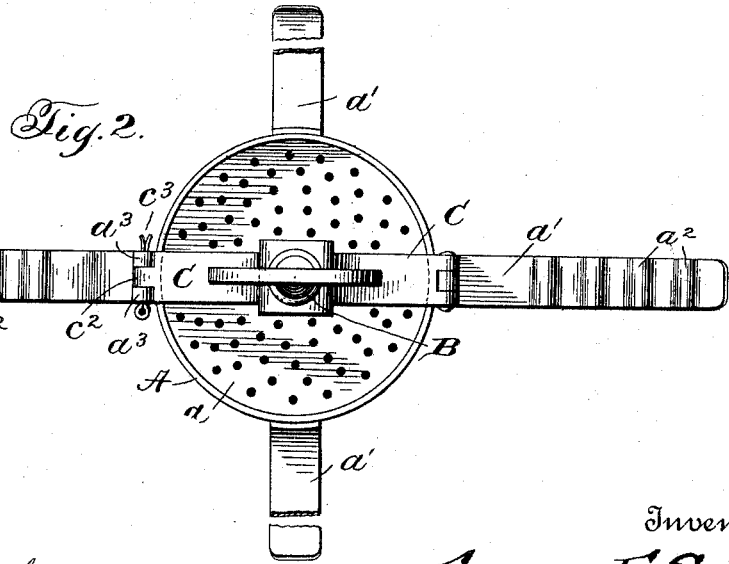
Witnesses:
Jas. E. Hutchinson.
Thos. R. Heath.
Inventor:
Frances E. Self,
By Jas. H. Hunter, Attorney.

UNITED STATES PATENT OFFICE.

FRANCES E. SELF, OF SPRINGFIELD, MISSOURI.

PRESS.

No. 929,717.  Specification of Letters Patent.  Patented Aug. 3, 1909.

Application filed October 2, 1908. Serial No. 455,888.

*To all whom it may concern:*

Be it known that I, FRANCES E. SELF, a citizen of the United States, residing at Springfield, in the county of Greene and State of Missouri, have invented certain new and useful Improvements in Presses, of which the following is a specification, reference being had therein to the accompanying drawing.

This invention relates to improvements in presses, and more particularly to the type of domestic presses known as fruit and lard presses.

The object of the present invention is the provision of a simple and efficient press of this character which can be easily manipulated to perform the function for which it is designed.

A further object of the invention is the provision of a press of this type which is fashioned so that it can be used in conjunction with a dish pan or other receptacle, the press being preferably provided with supporting means whereby it may be used with pans or receptacles of varying sizes.

Other objects of the invention will be apparent from the detailed description hereinafter, when read in connection with the accompanying drawings wherein a preferable embodiment of the invention is shown, and wherein like characters of reference refer to similar parts in the several views.

In the drawings: Figure 1 is a longitudinal section of my improved press supported upon the periphery of a pan or other receptacle, and Fig. 2 is a top plan view of the body of the press with parts broken away.

Referring now more particularly to the drawings, A designates the body of the press which is in the form of a perforated sheet metal cylinder, the lower end of which is closed by a perforated base $a$. Extending laterally from the lower end of the cylinder A are a plurality of legs $a'$ which are adapted to rest upon the upper edge of a pan or other receptacle so as to support the press in a proper position thereover. The legs $a'$ may be secured to the body A of the press in any suitable manner but they are preferably provided at the inner ends thereof with upwardly extending portions which are soldered to the exterior of the press body, said upwardly extending portions extending substantially the full length of the body and constituting reinforces therefor. To hold the press firmly in position upon the pan or receptacle, the legs $a'$ are each provided with a groove $a^2$ at the outer end thereof which is adapted to receive the upper edge the of pan or receptacle upon which the press is supported and to enable the press to be used with pans of varying diameters, each of said legs is preferably provided with a plurality of such grooves.

B designates a solid plunger which is adapted to work in the cylinder A. The plunger B is provided with a socket in the top thereof which is adapted to be engaged by the lower end of a screw threaded plunger rod B', the upper end of which projects through a feed nut $c$, which is fixedly secured to a yoke C which is adapted to overlie the open end of the cylinder A. The plunger B is preferably provided with a suitable handle $b'$ to facilitate its removal from the body of the press. One end of the yoke C is connected by a suitable hinge joint $c'$ to the upper edge of the cylinder A, said hinge connection being preferably made with the upper end of one of the upwardly extending portions of the legs $a'$, while the other end thereof is provided with an eye $c^2$, which when the yoke is in its lowered position is adapted to lie between and in alinement with a pair of eyes $a^3$ positioned adjacent the upper edge of the body A, the eyes $a^3$ being preferably formed integral with the upper end of one of the upwardly extending portions of the legs $a'$. A removable locking pin $c^3$ passes through the eyes $c^2$ and $a^3$ and serves to lock the yoke in its lowered position. It is obvious with this construction that when the plunger B is in its elevated position, by removing the locking pin $c^3$ the yoke C can be swung up to afford access to the interior of the cylinder A.

D designates an imperforate cylindrical shield which is of slightly greater diameter than the cylinder A and is adapted to surround the same to prevent spattering of the juice extracted. The shield D simply rests upon the legs $a'$ which project laterally from the lower portion of the cylinder A, so that it can be removed at any time.

E designates a strainer pan which is of slightly greater diameter than the shield D and is suspended by hangers $e$ of any suitable construction from the radially disposed legs $a^2$ of the cylinder A so as to underlie both the lower end of said cylinder and the shield D. The hangers $e$ are preferably in the form of hooks which are adapted to engage the legs $a'$, the free end of said hooks being bent downwardly for a slight distance to prevent accidental displacement of the strainer.

If desired the strainer E may be dispensed with and the perforated bottom $a$ of the cylinder A relied on to strain the material.

While I have described the supporting means for the press as consisting of legs which extend laterally from the lower ends of the body of the press and which are adapted to rest on the receptacle which receives the strained material, it is obvious that such legs may be provided at the outer ends thereof with downwardly extending portions if desired, so that the press can be supported directly upon a table or other support.

It is obvious that the construction heretofore described may be varied in many details without departing from the spirit of the invention as defined in the appended claims.

Having thus described the invention, what is claimed is:—

1. In a press of the character described, a perforated cylinder provided with a plurality of radially disposed legs extending outwardly from the lower end thereof and provided with grooves therein adapted to receive the upper edge of a receptacle, a plunger in said cylinder, and an imperforate sheet metal cylinder supported upon said radially disposed legs and surrounding the said perforated cylinder.

2. In a press of the character described, a perforated cylinder provided with means projecting from the lower portion thereof for supporting the same upon the upper edge of a receptacle, a plunger in said cylinder, and a strainer pan suspended from said supporting member.

3. In a press of the character described, a perforated cylinder provided with means projecting from the lower portion thereof for supporting the same upon the upper edge of a receptacle, a plunger in said cylinder, an imperforate shield removably supported around said cylinder, and a strainer pan suspended from said supporting means and underlying the lower ends of said cylinder and imperforate shield.

4. In a press of the character described, a cylinder, supporting legs for the cylinder, said legs being secured to and extending substantially the full length of the cylinder, a yoke pivotally secured at one end to the upper end of one of said supporting legs, means for locking the other end of said yoke to the upper end of another of said supporting legs, a plunger, and a plunger rod threaded in said yoke.

In testimony whereof, I affix my signature in presence of two witnesses.

FRANCES E. SELF.

Witnesses:
A. L. PAULY,
CLYDE WINEGARDNER.